(No Model.)

W. R. RIVES.
BEE HIVER.

No. 567,167. Patented Sept. 8, 1896.

Witnesses.
A. J. Bradley
J. W. Holman

Inventor.
Wm. R. Rives

UNITED STATES PATENT OFFICE.

WILLIAM R. RIVES, OF WOOD, KENTUCKY.

BEE-HIVER.

SPECIFICATION forming part of Letters Patent No. 567,167, dated September 8, 1896.

Application filed November 11, 1895. Serial No. 568,647. (No model.)

*To all whom it may concern:*

Be it known that I, WILLIAM R. RIVES, a citizen of the United States, residing at Wood, in the county of Butler and State of Kentucky, have invented certain new and useful Improvements in Bee-Hivers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to handle conveniently swarms of bees, so that they may be easily located in the hive intended for them.

Figure 1:
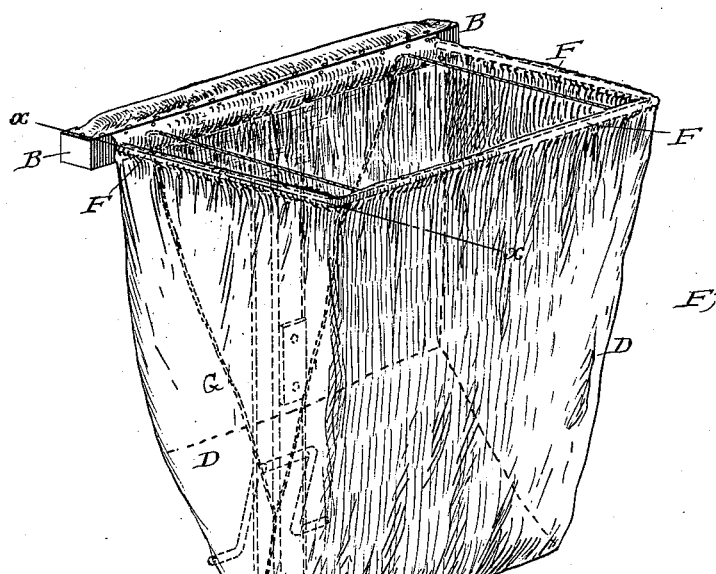
Figure 2:
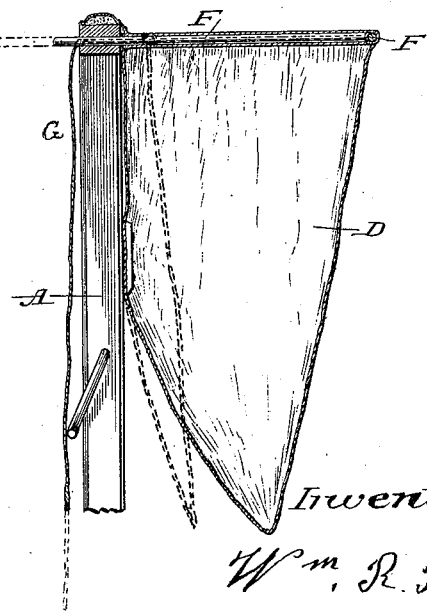

Figure 1 of the drawings is a perspective view showing my invention, and Fig. 2 a vertical section thereof.

In the drawings, A represents the staff or handle, and B a cross-piece on the upper end thereof.

D is a bag closed everywhere except at the top and provided in the upper edge with a three-sided frame F, made of wire, and whose parallel sides are movable through holes in the cross-piece B. To the wire-frame side opposite to the piece B, I attach a cord G, which is then carried through an eye or staple on the inside of the cross-piece B and the end allowed to hang down within convenient reach of the operator. The bag D is secured to one side of the bar B. The bees usually swarm and alight on the end of a limb or twig under which the operator holds the open mouth of the bag. The latter is then manipulated so as to inclose the whole swarm and the cord G pulled until the mouth of the bag is closed. The bag is then conveniently placed under a prepared hive and the wire frame pulled so as to open the mouth of bag. By this device the whole swarm is saved without injury and the operator does his work with impunity.

Having thus described all that is necessary to a full understanding of my invention, what I claim as new, and desire to protect by Letters Patent, is—

A bee-hiver consisting of the staff A, cross-bar B on the upper end of said staff, bag D, the wire frame F and the cord G, the said bag being attached to one side of bar B and the wire frame being secured in the edge of the bag and movable through the bar B as shown and described.

WILLIAM R. RIVES.

Attest:
R. JOHNSON,
J. W. HOLMAN.